(12) United States Patent
Grampurohit et al.

(10) Patent No.: US 9,406,170 B1
(45) Date of Patent: Aug. 2, 2016

(54) AUGMENTED REALITY SYSTEM WITH ACTIVITY TEMPLATES

(75) Inventors: Shweta D. Grampurohit, Seattle, WA (US); William R. Hazlewood, Seattle, WA (US); Beverly L. Harrison, Palo Alto, CA (US); Sunny A. Consolvo, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 629 days.

(21) Appl. No.: 13/550,446

(22) Filed: Jul. 16, 2012

(51) Int. Cl.
*G06T 19/00* (2011.01)
*G06T 3/00* (2006.01)

(52) U.S. Cl.
CPC ............... *G06T 19/006* (2013.01); *G06T 3/005* (2013.01)

(58) Field of Classification Search
CPC ............................... G06T 19/006; G06T 3/005
USPC ......................................................... 345/633
See application file for complete search history.

(56) References Cited

U.S. PATENT DOCUMENTS

| 7,418,392 | B1 | 8/2008 | Mozer et al. |
| 7,720,683 | B1 | 5/2010 | Vermeulen et al. |
| 7,774,204 | B2 | 8/2010 | Mozer et al. |
| 2011/0257575 | A1* | 10/2011 | Farrow et al. .................. 602/75 |
| 2012/0223885 | A1 | 9/2012 | Perez |
| 2013/0215132 | A1* | 8/2013 | Fong ............................. 345/582 |

FOREIGN PATENT DOCUMENTS

WO    WO2011088053 A2    7/2011

OTHER PUBLICATIONS

Fong, U.S. Appl. No. 61/602,036, filed Feb. 22, 2014, pp. 1-32.*
Fong, U.S. Appl. No. 61/602,036, filed Feb. 22, 2012, pp. 1-32.*
Artograph Digital Art Projector LED200 Artist Operation Guide, Dec. 25, 2010, Internet Archive, pp. 1-60, https://web.archive.org/web/20101225030310/https://www.artograph.com/products/documents/ArtographDigitalArtProjectorLED200SellSheet.pdf.*
Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jeffery A Brier
(74) *Attorney, Agent, or Firm* — Lee & Hayes, PLLC

(57) ABSTRACT

A projection and camera system creates an augmented reality environment in which images are projected onto a scene and user movement within the scene is captured. The system assists the user in performing various activities, such as productivity tasks, routine household tasks, and creative tasks. Predefined activity templates contain projectable patterns that, when projected into the environment in a certain sequence, guide the user through the activities.

31 Claims, 8 Drawing Sheets

AUGMENTED REALITY SYSTEM WITH ACTIVITY TEMPLATES

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

As augmented reality systems continue to advance, there is a continuing need for improved ways for such systems to interact in useful ways with users.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

An augmented reality environment is commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

Described herein is an architecture to create an augmented reality environment and to help the user perform various activities, such as productivity tasks, routine household tasks, and creative tasks. The architecture utilizes predefined activity templates that contain projectable patterns that, when projected into the environment by a projector, guide the user through the activities. As one example, the architecture can help guide users through common household activities, like folding clothes or cooking. Suppose, for instance, that the user wants to fold a shirt. A suitable activity template may hold a series of patterns that when projected in sequence, depict a series of fold lines on the shirt throughout the folding exercise to illustrate how to fold the shirt. In other scenarios, activity templates may include patterns to assist with painting a wall, playing a game, sewing, making a craft, and so forth. Several illustrative activities are described below in detail, but these are merely representative and not intended to be limiting.

The architecture may be implemented in many ways. One illustrative implementation is described below in which an augmented reality environment is created within a room. The architecture includes one or more projection and camera systems. Multiple implementations of various projection and camera systems are described. For instance, in one implementation, the projection and camera system is implemented to resemble a table lamp. However, the various implementations of the architecture described herein are merely representative.

Illustrative Environment

Figure 1:
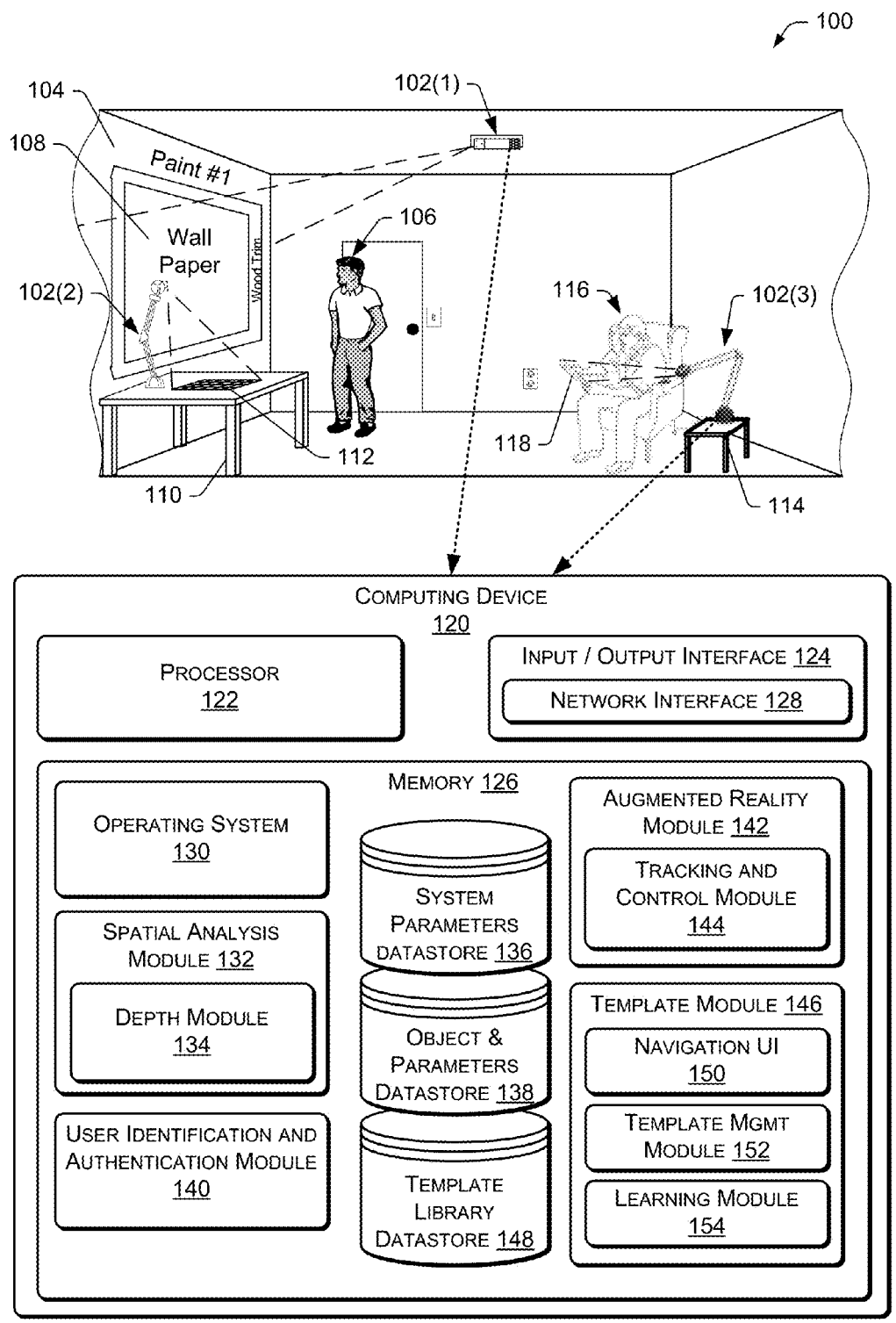
FIG. 1 shows an illustrative scene with an augmented reality environment hosted in an area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains at least a projector, a camera, and computing resources that are used to generate the augmented reality environment 100.

In this illustration, the first ARFN 102(1) is a fixed mount system that may be mounted within the room, such as to the ceiling, although other placements are possible. The first ARFN 102(1) projects images into the environment, such as onto a surface 104 on a wall of the room. In this example, the ARFN 102(1) is being used to assist a first user 106 in painting the wall. The ARFN 102(1) utilizes an activity template predefined for home improvement. This template has one or more patterns that may be projected onto a surface to be improved, such as a pattern to decorate the wall surface 104. In this example, a projected pattern 108 includes a design element (e.g., a frame area) and several word descriptions indicating where to apply wall paper, where and what color to paint a portion of the wall, and where to apply a wood trim.

The user 106 uses the projected outlines as a guide to paint, wallpaper, and add wood trim to the wall 104. The ARFN 102(1) may further monitor the user's progress and project other patterns as the user progresses. Further, the ARFN may discern if the user departs from the plan and inform the user. For instance, the camera may image the wall 104 and detect whether the user is applying a different paint color. In response, the ARFN 102(1) may inform the user that the paint color is not as intended by the plan.

One implementation of the first ARFN 102(1) is provided below in more detail with reference to FIGS. 2 and 3. Other examples of activity templates that may be used by the ARFN 102(1) are described below with reference to FIG. 5.

A second ARFN 102(2) is embodied to resemble a common table lamp, which is shown sitting on a desk 110. The second ARFN 102(2) projects images 112 onto the surface of the desk 110 for the user 106 to consume and/or interact. The projected images 112 may be patterns selected from various activity templates that can guide a user through any number of activities, such as homework, games, research, or cooking recipes.

A third ARFN 102(3) is also embodied to resemble a common table lamp, shown sitting on a small table 114. A second user 116 is seated in the chair and is holding a piece of material 118, such as fabric or paper. The third ARFN 102(3) projects images in the form of patterns onto the surface of the material 118 for the user 116 to interact. The projected patterns may be any number of things, such as fold lines to fold the material 118, graph lines projected onto the material 118, image outlines for fine painting a picture on the material 118, and other patterns. In other implementations, the ARFN 102 (3) may further be configured to project images in the form of electronic books, games (e.g., crosswords, Sudoku, etc.), news, magazines, movies, browser, and so forth onto the material 118.

One implementation of the second and third ARFNs 102(2) and 102(3) is provided below in more detail with reference to FIG. 4. Other representative examples of activity templates that may be used by the second and third ARFNs 102(2) and 102(3) are described below with reference to FIGS. 6 and 7.

The examples described herein are merely representative and are not intended to be limiting. Other scenarios may be supported in which the projection of a sequence of patterns guides a user through an activity. Further, the ARFNs may be embodied in other form factors and or mounted or placed in other locations. In other implementations, for example, one or more ARFNs may be placed around the room in any number of arrangements, such as on in furniture, on the wall, beneath a table, and so forth.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. It may be further configured with a user interface (UI) to facilitate interaction with the user, such as voice instruction, gesture recognition or motion via the cameras, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

In some implementations, the spatial analysis module 132 may include a depth module 134 to measure the distance to various objects in the environment. In some cases, the depth module may utilize time of flight for an infrared (IR) signal (or other modulated light output). The time-of-flight value may be derived as a function of a time lapse between emission of the IR light and capture of the IR light scattered by the environment. Alternatively, the time-of-flight value may be derived as a function of the phase difference between the modulated light output and the returned light.

A system parameters datastore 136 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object and parameters datastore 138 in the memory 126 is configured to maintain information about the state of objects within the environment and a library of pre-loaded reference objects. The object parameters may include the surface contour of the object, overall reflectivity, color, and so forth. This information may be acquired from the ARFN, other input devices, or via manual input and stored within the object parameters datastore 138. The library of pre-loaded reference objects may include assumptions about the object, dimensions, and so forth. For example, the datastore 138 may include a reference object of a beverage can and include the assumptions that beverage cans are either held by a user or sit on a surface, and are not present on walls or ceilings.

The spatial analysis module 132 may use this data maintained in the datastore 138 to test dimensional assumptions when determining the dimensions of objects within the scene. For example, objects in the scene which are temporally persistent, such as walls, a particular table, particular users, and so forth may be stored within the object datastore 138. The object datastore 138 may be stored on one or more of the memory of the ARFNs, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

With user identification, the ARFNs can better interact and tailor activities for the particular user. For instance, in response to a request for a painting template from a parent, the ARFN may select the template to assist the parent in improving the wall surface 104. Alternatively, a request to paint form a child may result in depiction of a picture on a piece of paper on a table surface for the child to color. User preferences and profiles may be stored in one of the datastores.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

A template module 146 is configured to facilitate use of activity templates within the environment 100 to guide or otherwise assist a user when performing an activity, such as home improvement, household activities, crafts, games, and so forth. The template module 146 accesses activity templates that are maintained in a template library datastore 148 and apply the activity template to assist the user in the activity. The template library datastore 148 includes one or more predefined activity templates. Each activity template has one or more patterns to be projected by a projector in an ARFN into the environment 100 to assist a user in performing an associated activity. For instance, continuing the example of folding a shirt, the activity template may include a series of patterns depicting fold lines at various points of the shirt being folded. A first pattern may depict the first fold line, and a second pattern may depict the next fold line, and so on.

The template module 146 facilitates selection of the activity template from the template library datastore 148. Template selection may be accomplished in different ways, such as in response to an explicit user command or based on a recommendation made by the template module 146. The template module 146 may include a navigation user interface (UI) 150 to enable user selection of the activity templates. The navigation UI 150 may accept voice commands, gesture commands, or other ways of human interaction with the ARFN. For instance, the user may request an activity template by saying a recognizable command such as "Template" followed by a description of the type of template, such as "fold shirt". If the ARFN is equipped with more sophisticated language models, the user may further use a simple phrase like "help me fold a shirt" and the computing device 120 parses the statement and identifies the most likely matching template.

The template module 146 also includes a template management module 152 to manage the selected template and apply the patterns in a suitable sequence for projection to lead the user through the task. For instance, the template management module 152 may choose the first pattern in the template to help the user with the first step in the activity. Once that is completed, the template management module 152 determines when to switch to the next pattern. The transition may be triggered by a user command. For instance, the user may utter a voice command (e.g., "Next") to sequence through subsequent patterns. Alternatively, the transition may be triggered by imaging data captured by the camera and interpreted by the augmented reality module 144. For instance, the user may swipe his hand to motion when to switch to the next template.

The template module 146 may further include a learning module 154 that receives data from the augmented reality module 142 to monitor user behavior over time. Then, based at least partly on the historic user behavior, the learning module 154 determines a next activity to be performed by the user. For instance, if the user typically folds clothes after cooking dinner, the learning template 154 may anticipate this set of events and offer the cooking activity template first, followed by the folding activity template. Other metadata, such as time of day, day of week, temperature, etc., may also be used by the learning module 154 to automatically select activity templates in advance of user requests for them.

The ARFNs 102 and computing components of device 120 that have been described thus far may be operated to create an augmented reality environment in which template-driven patterns are projected onto various surfaces in the room to guide the users 106 and 116 through various activities. The users' movements, voice commands, and other interactions are captured by the ARFNs 102 to facilitate user input to the environment.

Representative ARFN Implementations

Before describing various representative scenarios in which the ARFNs may use activity templates to help users with various activities, the ARFNs 102(1)-(3) are described in more detail. These ARFNs provide the projection and imaging functionality to facilitate template-aided user guidance.

Figure 2:
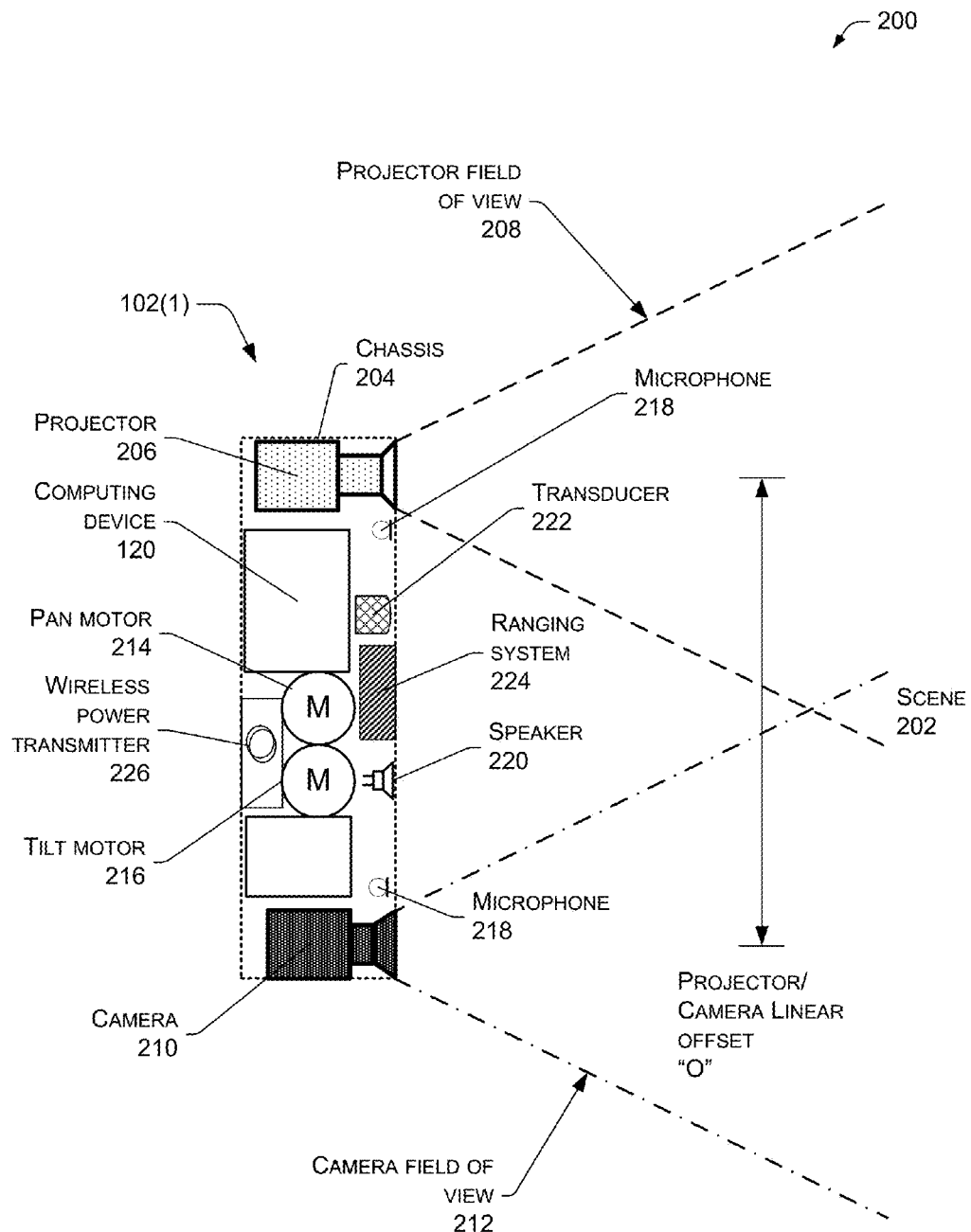
FIG. 2 shows a first implementation of a projection and image capturing system formed as an augmented reality functional node having a chassis to hold a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects within the environment 100. The ARFN 102(1) may also be configured to provide augmented reality output, such as images, template patterns, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 210, as designated by a projector/camera linear offset "O". This offset is the linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 212 may vary. Also, the angle of the projector 206 and the camera 210 relative to the chassis 204 may vary.

Due to this offset "O", the projector 206 and camera 210 employ separate optical paths. That is, the projector 206 employs a set of lenses to project images along a first optical path therein, and the camera 210 employs a different set of lenses to image the scene by capturing the light scattered by the surroundings.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
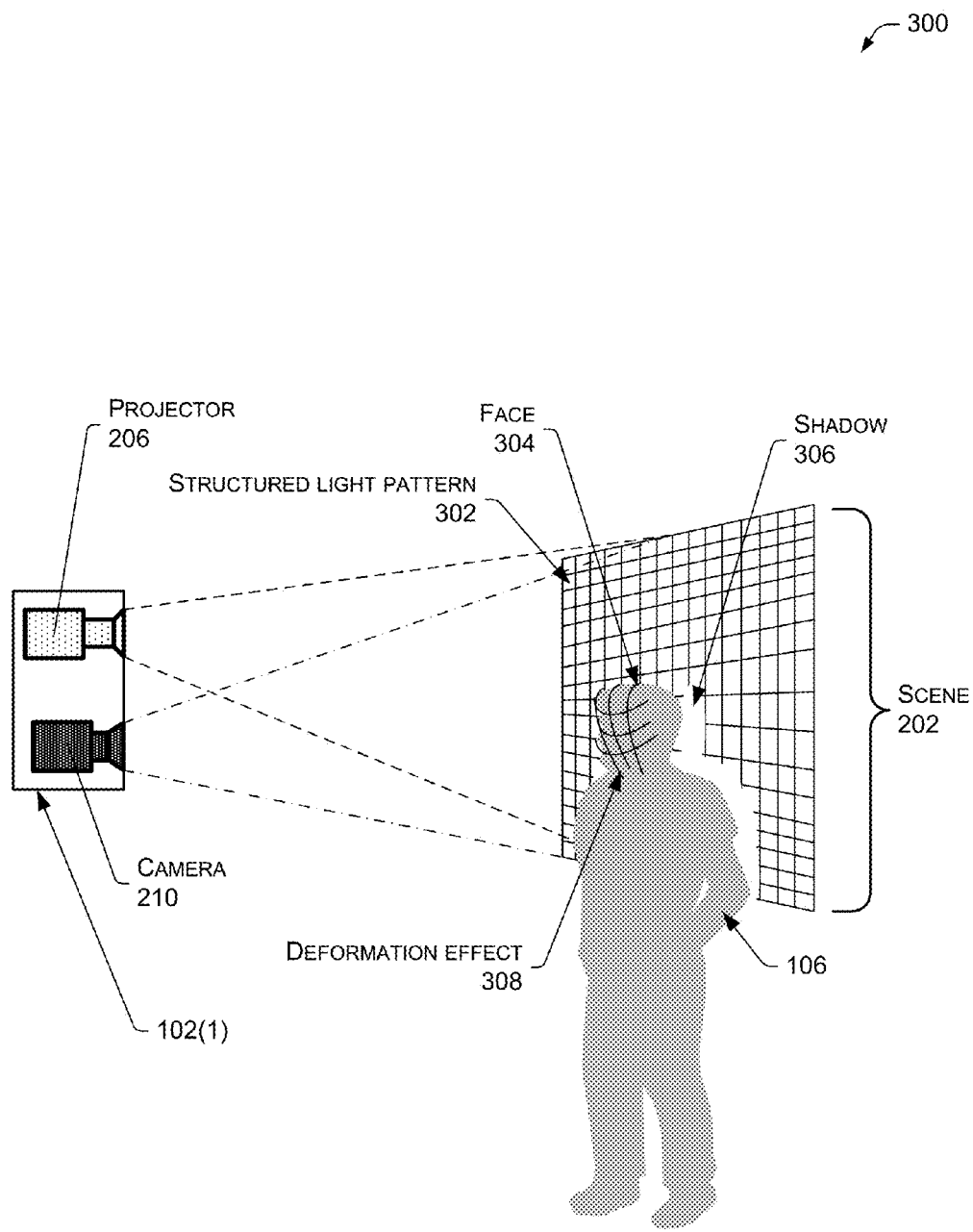
FIG. 3 illustrates one example implementation of creating an augmented reality environment by projecting structured light on a scene in the environment and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the structured light pattern 302 interacts with the facial features. This deformation effect 308 is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied as common table lamps, where the projector and camera reside in a head of the lamp.

Figure 4:
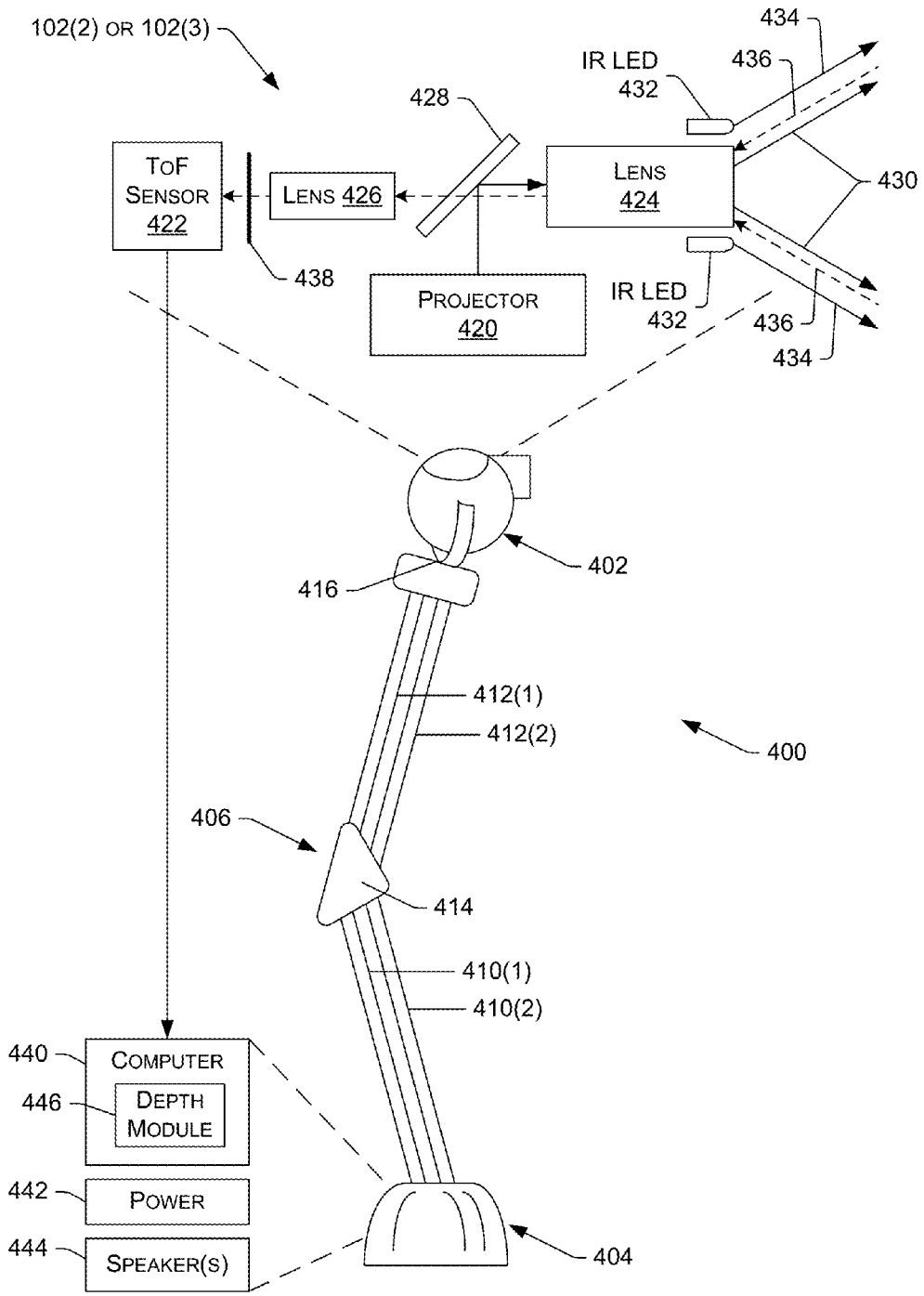
FIG. 4 shows a second implementation of a projection and image capturing system formed to resemble a familiar type of furniture, such as a table lamp. In this implementation, the projector and camera share a common optical path through a lens.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). The universal connector 416 is described below in more detail with reference to FIG. 7. In other implementations, the head 402 may be mounted to the arm mechanism 406 in a fixed manner, with no movement relative to the arm mechanism 406, or in a manner that enables more or less than two degrees of freedom.

The head 402 holds several components, including a projector 420 and a time of flight (ToF) sensor 422. In this example, the ToF sensor 422 measures IR signal reflections from objects within the scene. The ToF sensor 422 may be implemented as a standalone sensor, or as part of a camera. The head also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., overscan/underscan).

The projector 420 projects an image that is reflected off an angled beam splitter 428 and out through the lens 424. The beam splitter 428 may be, for example, embodied as a dichroic beam splitter having a coated prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434.

The IR signals are scattered from objects in the scene and returned to the lens 424, as represented by the incoming pair of arrows 436. The captured IR signals are passed through the lens 424 and through the dichroic beam splitter 428 to the secondary lens 426. The IR signals are then optionally passed through an IR filter 438 (or other filter type) to the ToF sensor 422. In other implementations, the IR signals may be passed directly from the lens 426 to the ToF sensor 422, without going through the IR filter 438. Accordingly, the IR signals are emitted out from the head 402, scattered by the objects, and collected by the head 402 for capture by the ToF sensor 422 as a way to image the scene. This technique is performed in lieu of using structured light, as implemented in the implementation of the first ARFN 102(1).

It is noted that, in other implementations, the projector 420 may be arranged to project an image that is passed through the beam splitter 428 and out through the lens 424, rather than being reflected by the beam splitter 428. In this arrangement, the returning IR signals may be received back through the lens 424 and reflected by the beam splitter 428 to the lens 426 and ToF sensor 422. Said another way, the projector 420 and IR components (i.e., ToF sensor 422, lens 426 and optionally filter 438) may be swapped so that the returning IR signals are reflected by the beam splitter 428 rather than the projected image. Other arrangements may also be possible where at least part of the optical path is shared by the projection and depth capture.

The lamp-based ARFN 102(2) or 102(3) may also be equipped with one or more components in the base 404. In this example, a computer 440 resides in the base 404, along with power components 442 and one or more speakers 444. The computer may include processing and memory to execute instructions. A depth module 446 may be executed by the computer 440 to measure a time of flight for an IR signal (or other modulated light output). The time-of-flight value may be derived as a function of a time lapsed between emission from an IR LED 432 and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Illustrative Template-Aided Scenarios

Figure 5:
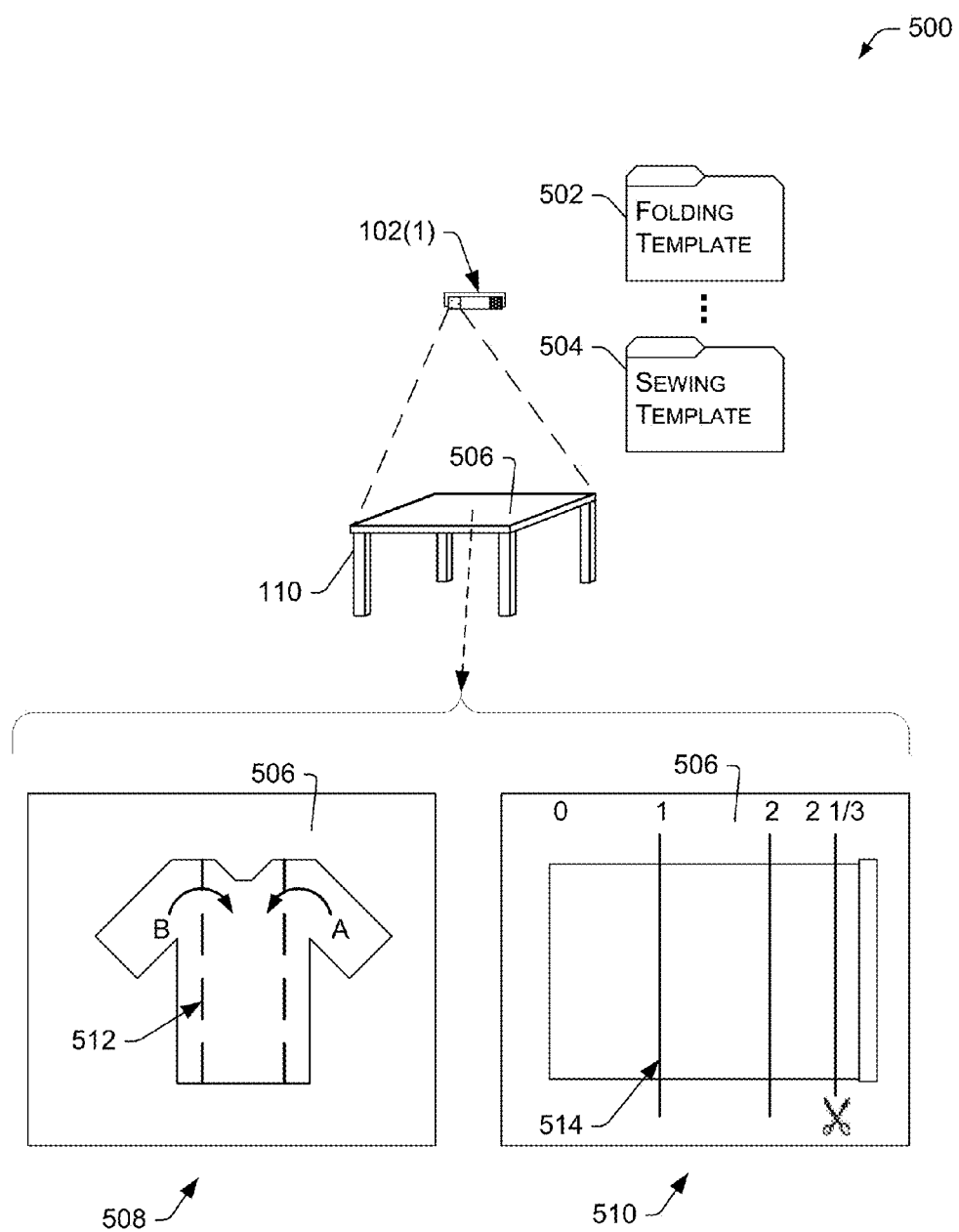
FIG. 5 shows example scenarios of using the projection and image capturing system of FIG. 2 to assist a user when performing household tasks. The system projects patterns from activity templates into the environment to guide the user through the tasks.
Figure 6:
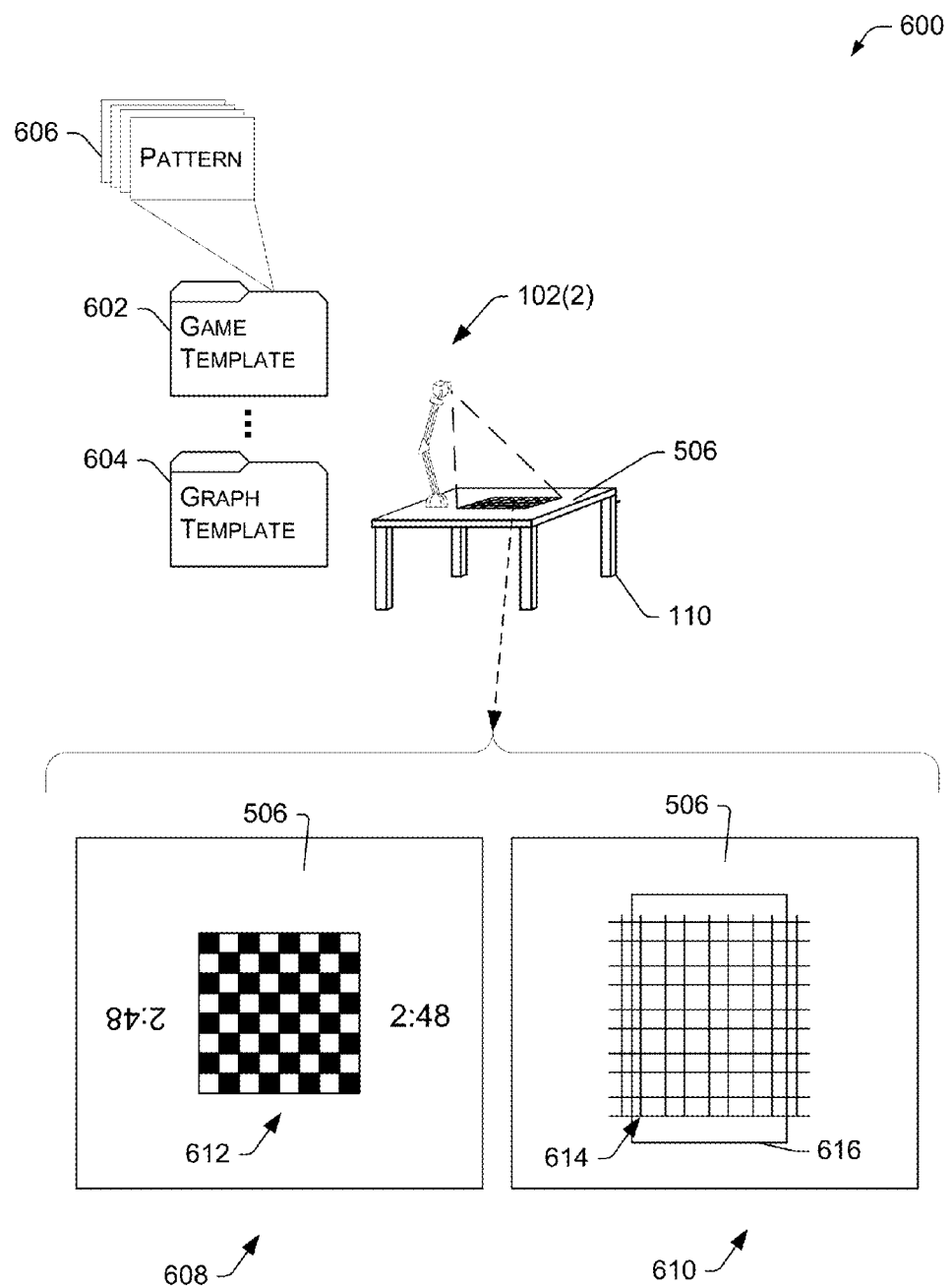
FIG. 6 shows example scenarios of using the projection and image capturing system of FIG. 4 to assist a user when playing games or drawing.
Figure 7:
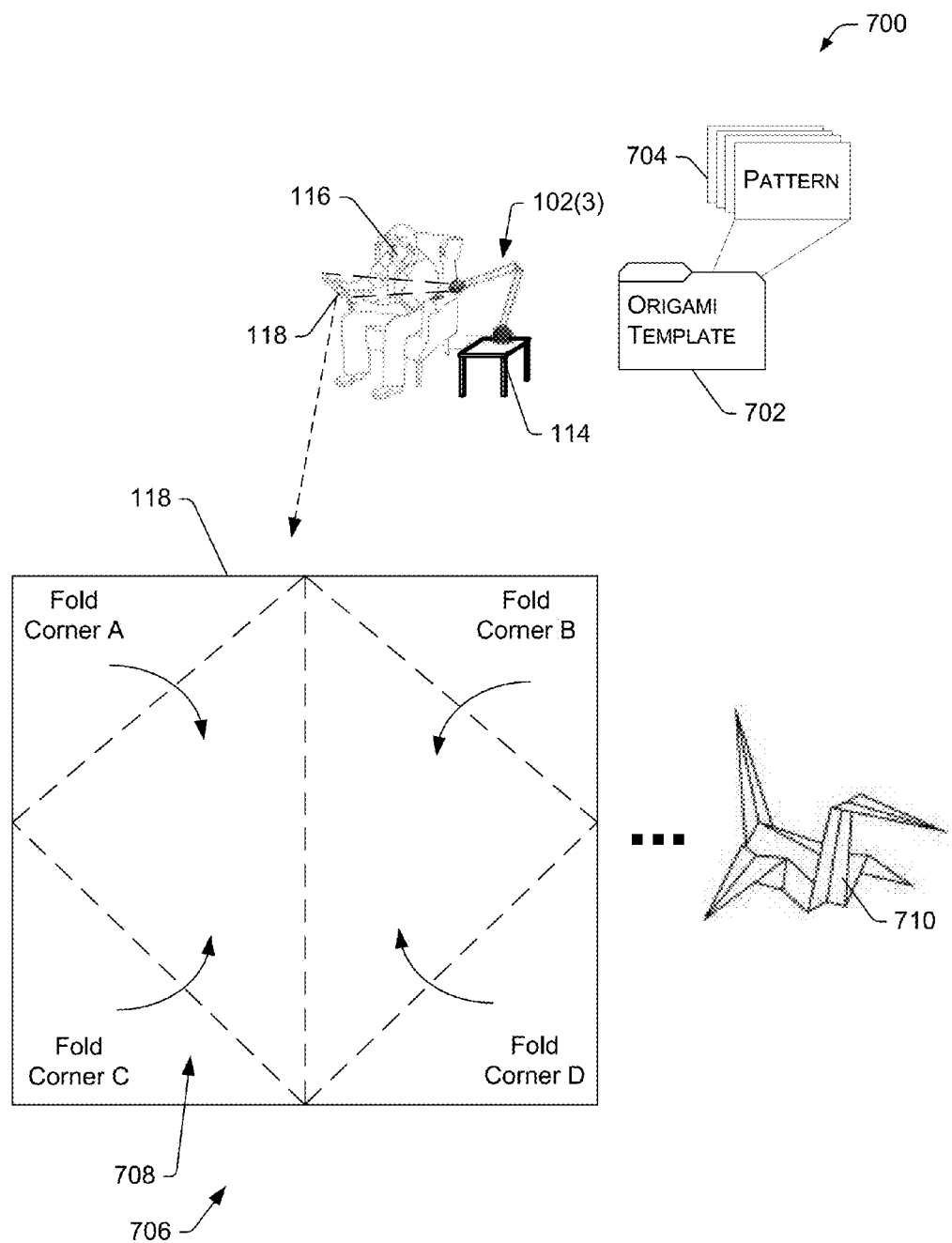
FIG. 7 shows yet another example scenario of using the projection and image capturing system of FIG. 4 to assist a user when making crafts, such as origami.

FIGS. 5-7 illustrate various representative scenarios in which the ARFNs utilize activity templates to guide users through corresponding activities. The scenarios are shown as being performed by various ARFNs 102(1), 102(2), and 102(3), although any one of the scenarios may be facilitated by any one of the ARFNs, or other devices that have projector and computing capabilities. Further, these are merely representative of a vast number of activities that may be performed by projecting illustrative patterns onto surfaces to guide users through projects and other activities.

FIG. 5 shows example scenarios 500 of using a projection and image capturing system, such as ARFN 102(1), to assist a user when performing household tasks. The ARFN 102(1) has access to the template library datastore 148 and can choose any one of the templates stored therein. In this example, the ARFN 102(1) utilizes a folding template 502 and a sewing template 504 as representative templates used in household tasks. Other suitable templates might be furniture arrangement, setting a table with silverware, cooking aids, cleaning guides, and so forth.

Each activity template has one or more patterns that may be projected onto a surface, such as the top surface 506 of the table 110. Illustrated beneath the table 110 are two top views 508 and 510 of the table surface 506 to illustrate one of the patterns from each of the folding template 502 and sewing template 504. In the first top view 508 of the table surface 506, a garment (e.g., shirt) is placed on the surface. A pattern 512 from the folding template 502 is projected onto the clothing garment to depict folding operations. In this illustration, the pattern 512 includes a depicted "A" and directional arrow to visually instruct the user to fold the right half of the shirt onto the mid-section about a dashed fold line as the first folding step. The pattern 512 further includes a depicted "B" and directional arrow to visually instruct the user to fold the left half of the shirt onto the mid-section about another dashed fold line as the second folding step.

In the second top view 510 of the table surface 506, a roll of material is placed on the surface with part of the material unrolled and laid across the surface. A pattern 514 from the sewing template 504 is projected onto the material to illustrate various lengths of material to cut when starting a sewing project. Here, the ARFN 102(1) detects the edge of the material and then identifies each yard with a line demarcation projected onto the material. Suppose the sewing project calls for two and one-third yards of material. Accordingly, the correct length of 2⅓ yards is identified with a projected line, along with a "scissor" symbol to inform the user of where to cut the material.

FIG. 6 shows example scenarios 600 of using a projection and image capturing system, such as ARFN 102(2), to assist a user when playing games or drawing. The ARFN 102(2) has access to the template library datastore 148 and can choose any one of the templates stored therein. In this example, the ARFN 102(2) utilizes a board game template 602 and a graph template 604 as representative templates, although other suitable templates might be employed.

Each activity template has one or more patterns, as represented by patterns 606 in the game template 602, which may be projected onto a surface such as the top surface 506 of the table 110. Illustrated beneath the table 110 are two top views 608 and 610 of the table surface 506 to illustrate one of the patterns from each of the game template 602 and the graph template 604. In the first top view 608 of the table surface 506, a projected pattern 612 from the game template 602 is projected onto the surface 506. In this illustration, the pattern 612 conveys a checker or chess board, along with two time clocks that might be used in competitive chess.

In the second top view 610 of the table surface 506, a pattern 614 from the graph template 604 is projected onto a sheet of material 616, such as paper, to illustrate grid lines used in graph paper. Here, the ARFN 102(2) may project grid lines across the entire surface 506, or otherwise detect the edges of the paper 616 and project grid lines on or about the paper 616. In other examples, the projected image may be an outline for a picture or a paint-by-numbers pattern.

FIG. 7 shows yet another example scenario 700 of using a projection and image capturing system, such as ARFN 102(3) of FIG. 1, to assist a user when doing crafts, such as origami. The ARFN 102(3) has access to the template library datastore 148 and as above, can choose any one of the templates stored therein. In this example, the ARFN 102(3) utilizes an origami craft template 702 as a representative template. The origami template 702 has multiple patterns, as represented by patterns 704, which may be projected in a sequence onto a surface such as the piece of material 118 in the hands of user 116. The ARFN 102(3) can register the material and its edges by imaging and depth analysis processes. Then, the ARFN 102(3) can focus projection of the patterns from the templates on to the material 118 as the user works with the material to form an origami shape.

Illustrated beneath the user 116 and table 114 is a front face view 706 of the material 118. A first pattern 708 from the template 702 is shown projected onto the material 118. Here, the pattern 708 shows initial steps in folding a square piece of material (e.g., paper) into a decorative shape, like the bird 710. The user is shown to define a midline by folding and unfolding the material in half, and then folding each flap or corner into the center as illustrated by projected dashed lines and directional arrows, optionally accompanied by word instructions.

Illustrative Process

Figure 8:
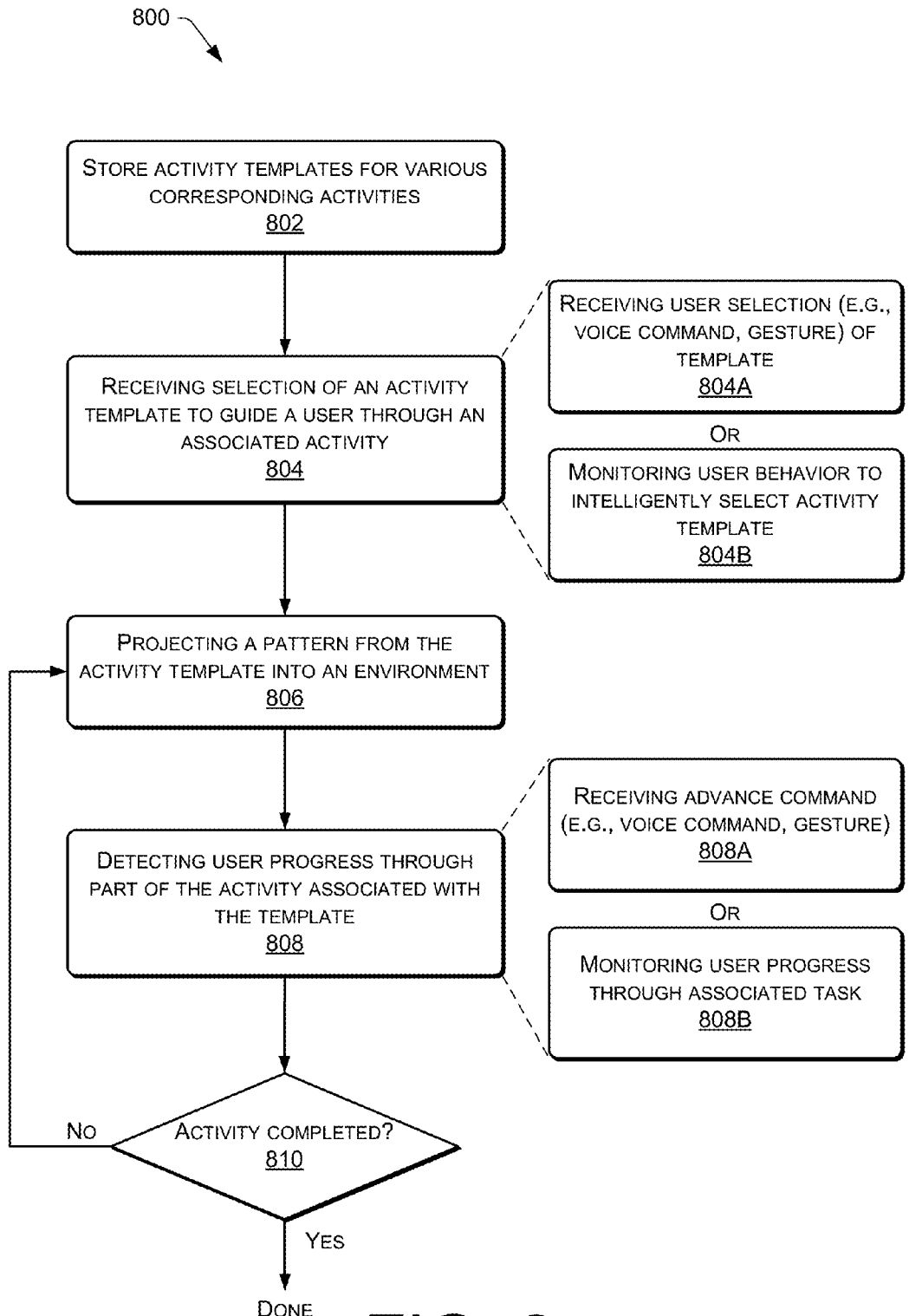
FIG. 8 shows an illustrative process of using a projection and camera system in an augmented reality environment to guide a user through an activity.

FIG. 8 shows an illustrative process 800 of providing using a projection and camera system to create an augmented reality environment that aids users when performing various activities. The process described below may be implemented by the architectures described herein, or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

At 802, activity templates are predefined for various corresponding activities and stored in a library maintained in a storage memory. Each activity template has one or more patterns and associated metadata to facilitate selection and projection of the patterns in a sequence to assist the use in performing a corresponding activity. Representative activities are described above with reference to FIGS. 1 and 5-7.

At 804, an activity template is selected from the library to help the user with an activity. This selection may be accomplished in a number of ways, two of which are shown for discussion purposes. In one approach, at 804A, the user explicitly requests a template through a command, such as a voice command or a gesture. In another approach, at 804B, user behavior is monitored (e.g., via ARFN 102) and based in part on this behavior, a corresponding activity is determined and a suitable template is recommended to the user.

At 806, a pattern from the activity template is chosen and projected in the environment. The pattern may be projected and focused onto a surface such as the surface of a table or wall, or onto an object such as a clothing garment or paper. The projected pattern has demarcations that aid the user when performing the activity. Example demarcations might include solid lines, dashed lines, direction arrows, registration marks, and so forth. The demarcations may or may not include written words, symbols, and so forth.

At 808, user progress through the activity is monitored. In this way, the system can transition through the sequence of patterns in the template to guide the user through the entire activity. There are various ways to track the user progress. A first approach, represented at 808A, is to receive commands from the user. For instance, as the user completes one of the steps, the user may give a command (e.g., voice, gesture, etc.) to move to the next pattern. A second approach, at 808B, involves monitoring the user progress through the activity. For example, the camera of the ARFN 102 images the environment and the user movement is analyzed to discern progress through the activity. In some implementations involving imaging, the ARFN 102 may further detect if the user is departing from a predetermined plan (e.g., applying a different paint color) and inform the user of this departure.

At 810, it is determined whether the activity is completed. If the pattern is not the last pattern in the template indicating that the user is not fully finished (i.e., the "No" branch from 810), a next pattern in the sequence is selected and projected into the environment at 806. If the user has progressed more quickly, the next pattern may be farther along in the sequence so that the next pattern projected offers the next step from the user's current status. Alternatively, if the user has completed the activity as indicated by the last pattern being projected (i.e., the "Yes" branch from 810), the process ends.

In this manner, the methodology enabled by the projection and camera system allows for projection of a sequence of patterns that assist a user in progressing through an activity. The methodology tracks user progress through the activity until that activity is completed.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    a memory;
    a processor;
    a projector to project two or more projection images into an environment;
    a camera to capture one or more environment images of the environment, the one or more environment images used at least in part for determining user interaction with the two or more projection images projected into the environment;
    the memory, configured to store one or more activity templates, each activity template including two or more patterns to be projected by the projector into the environment to assist a user in performing an activity; and
    instructions stored in the memory and executed by the processor, to cause the processor to access the memory, facilitate use of at least one of the one or more activity templates, and perform operations comprising:
        facilitating at least one of (1) user selection of the activity template from the memory, or (2) suggestion of the activity template to the user; and
        providing patterns corresponding to the selected or suggested activity template for projection by the projector, the patterns provided in a sequence based on the user progressing through each pattern of the activity template as determined using the environment images captured by the camera.

2. The system of claim 1, wherein each of the two or more patterns comprises one or more of demarcations, symbols or word descriptions that, when projected by the projector, guide the user through corresponding steps of the activity.

3. The system of claim 1, wherein one of the activity templates comprises a folding template including a sequence of patterns to be projected by the projector onto a surface of a material to be folded, wherein the projected patterns depict fold lines on the material to guide the user in folding the material.

4. The system of claim 3, wherein the material comprises clothing fabric, and the projected sequence of patterns depict a series of fold lines on the clothing fabric.

5. The system of claim 3, wherein the material comprises paper and the projected sequence of patterns depict a series of fold lines on the paper.

6. The system of claim 1, wherein one of the activity templates comprises a sewing template including a sequence of patterns to be projected by the projector onto a surface of a material to guide the user in cutting the material into pieces and sewing the pieces together.

7. The system of claim 1, wherein one of the activity templates comprises a painting template including at least one pattern to be projected by the projector onto a surface to guide the user in painting on the surface.

8. The system of claim 1, wherein the activity templates comprises a board game template including one or more patterns to be projected by the projector onto a surface to form a board game image and thereby facilitate game play by the user.

9. The system of claim 1, wherein the operations further comprise monitoring user behavior over time and based at least partly on the user behavior, to determine a next activity to be performed by the user; and
selecting an activity template that, when projected, is to assist the user with the determined next activity.

10. The system of claim 1, wherein the operations further comprise using the environment images captured by the camera to determine user progress through the activity.

11. A system comprising:
a memory;
a processor;
the memory configured to store one or more activity templates, each activity template including two or more patterns to be projected onto a surface to assist a user in performing an activity; and
instructions stored in the memory and executed by the processor, to cause the processor to select a given activity template from the memory and to provide the two or more patterns from the given activity template for projection onto the surface in a sequential order to guide the user through the activity.

12. The system of claim 11, further comprising a projector to project the patterns onto the surface.

13. The system of claim 12, further comprising a camera to capture one or more environment images of an environment encompassing the surface, the one or more environment images used at least in part for determining user interaction with the two or more patterns projected onto the surface.

14. The system of claim 11, wherein the two or more patterns are projected onto a surface of an object to assist the user in performing an activity associated with the object.

15. The system of claim 11, wherein the operations further comprise facilitating at least one of (1) user selection of the activity template from the memory, or (2) suggestion of the activity template to the user.

16. The system of claim 11, wherein the operations further comprise:
monitoring user behavior over time and based at least partly on the user behavior, determine a next activity to be performed by the user; and
recommending, to the user, an activity template suitable to assist with the next activity.

17. The system of claim 11, wherein the activity templates comprise household chores templates including sequences of patterns to be projected onto various surfaces to assist the user in doing household chores.

18. The system of claim 11, wherein the sequence is based at least in part on user progress associated with the activity.

19. One or more non-transitory computer-readable storage media storing computer-executable instructions that, when executed, cause one or more processors to perform acts comprising:
providing an activity template, the activity template including two or more patterns to be projected into an environment to guide a user through corresponding one or more steps in an activity;
choosing a first pattern from the activity template for projection into the environment to provide guidance to the user for performing a corresponding step in the activity;
receiving an indication of the user's performance of the corresponding step; and
repeating the choosing and the receiving for a second pattern in the activity template.

20. The one or more non-transitory computer-readable storage media of claim 19, wherein the choosing and the receiving are repeated for one or more subsequent patterns after the second pattern until the user has performed the activity.

21. The one or more non-transitory computer-readable storage media of claim 19, wherein choosing a first pattern comprises enabling user selection of the activity template and selecting the first pattern in the activity template.

22. The one or more non-transitory computer-readable storage media of claim 19, wherein choosing the second pattern comprises:
capturing an image of the environment with a camera to determine when the user has performed the corresponding step; and
selecting the second pattern in the activity template that guides the user through a next step of the activity.

23. The one or more non-transitory computer-readable storage media of claim 19, wherein receiving the indication comprises detecting user interaction with the first pattern.

24. The one or more non-transitory computer-readable storage media of claim 19, wherein receiving the indication comprises capturing an image of the environment with a camera to monitor user interaction with the first pattern.

25. A method comprising:
providing an activity template including two or more patterns to be projected into an environment to guide a user through corresponding one or more steps in an activity;
projecting, in a sequence, the two or more patterns in the activity template to guide the user in performing the corresponding steps for the activity; and
determining, by one or more processors executing non-transitory computer-readable storage media storing computer-executable instructions, user progress through the activity as the patterns are projected in the sequence in order to advance from pattern to pattern.

26. The method of claim 25, wherein the determining comprises capturing images of the environment with a camera.

27. The method of claim 25, wherein the determining comprises receiving a user command.

28. The method of claim 27, wherein the user command comprises at least one of a voice command or a gesture.

29. The method of claim 25, wherein the activity templates comprise household chores templates including patterns to be projected onto various surfaces to guide the user through household chores.

30. The method of claim 25, wherein the activity templates comprises a game template including two or more patterns to be projected by the projector onto a surface to facilitate game play by the user.

31. The method of claim 25, further comprising:
monitoring user behavior over time;
based at least partly on the user behavior, determining a next activity to be performed by the user; and
selecting an activity template that includes two or more patterns that, when the two or more patterns are projected, are to assist the user with the determined next activity.

* * * * *